C. F. SHERWOOD.
BEARING.
APPLICATION FILED FEB. 24, 1920.
1,416,988.
Patented May 23, 1922.
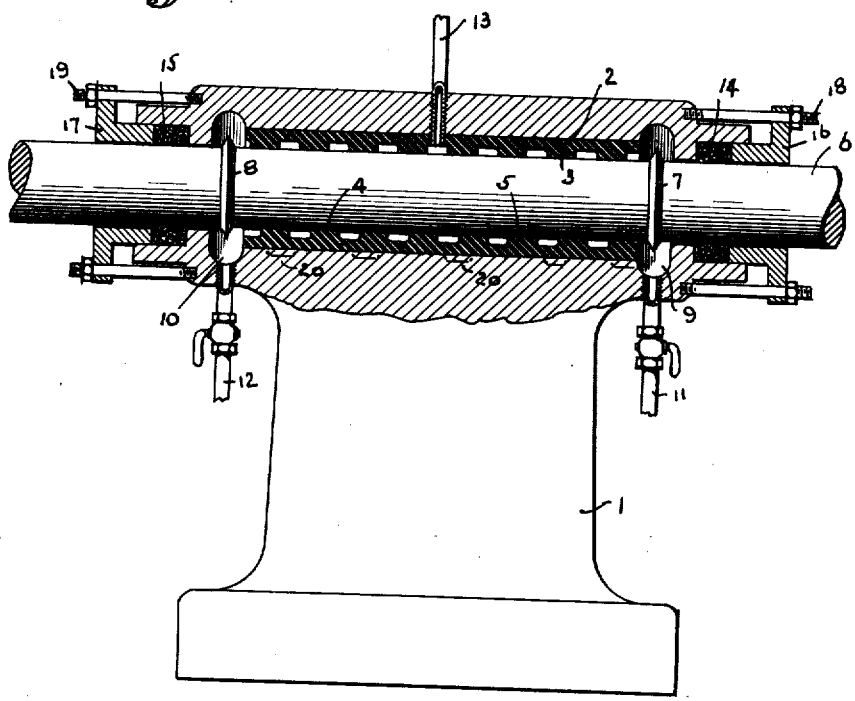
Fig. 1.
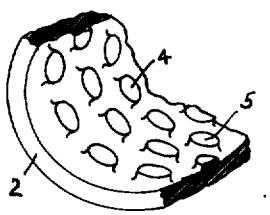
Fig. 2.
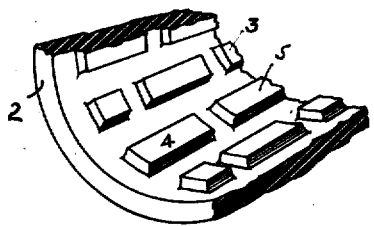
Fig. 3.
INVENTOR
CHARLES FREDERIC SHERWOOD
BY
ATTORNEY.

UNITED STATES PATENT OFFICE.

CHARLES FREDERIC SHERWOOD, OF LOS ANGELES, CALIFORNIA.

BEARING.

1,416,988.      Specification of Letters Patent.      Patented May 23, 1922.

Application filed February 24, 1920. Serial No. 360,702.

*To all whom it may concern:*

Be it known that I, CHARLES FREDERIC SHERWOOD, a citizen of the United States, and a resident of the city of Los Angeles, county of Los Angeles, and State of California, have invented new and useful Improvements in Bearings, of which the following is a specification.

My invention relates to bearings for supporting shafts or other rotating members, and has for its principal object the supporting of shafts in wet locations and of machinery adapted to vibration, or in which the ordinary means of support and lubrication is inadequate. It is particularly adapted to mining machinery although generally applicable also in a much wider field.

Some of the objects of my invention are the maintenance of alignment and minimum wear of the parts, the maintenance of perfect bearing and journal surfaces with the least amount of frictional effort and the cool and efficient operation of the parts.

These objects I attain by providing a plurality of bearing surfaces of rubber or other elastic material, which collectively support the shaft journal and which are fitted into a supporting structure as a well known bearing sleeve or pedestal. I provide water or other lubrication around the bearing surfaces, so that the journal surface is wetted thereby and a water film is established and maintained between the bearing surfaces and the shaft journal.

A few of the advantages derived from the use of rubber or other elastic material for bearing purposes are the minimum of wear; the equalization of support over the entire bearing surface resulting from the flexibility of rubber; the freedom from friction when a water film or other suitable lubricant is maintained between the bearing surface and the shaft journal; and the relatively long life of rubber in the presence of water. Other objects will appear from the drawings and specification which follow.

Furthermore, by the use of rubber or other elastic or yielding material for a bearing surface, sand or grit will not embed itself therein as is the case with a metal bearing where the metal surface acts as a tool-holder for the sand, thereby causing the sand to score and cut the shaft.

By referring to the drawings my invention will be made clear.

In the drawings:

Figure 1 is a part section and part view of a bearing pedestal provided with my invention and in which is supported a shaft.

Fig. 2 is a perspective view of one form of the bearing surface.

Fig. 3 is a perspective view of another form of bearing surface.

Throughout the figures similar numerals refer to identical parts.

A supporting pedestal or stand of any well known form is indicated by the numeral 1, within which is to be supported a specially formed sleeve of rubber or other elastic material as 2. This I provide on its inner or shaft side with projections as 3, 4, 5, which projections are adapted to collectively form the cradling or bearing surface for the journal of the shaft 6.

On each side of the shaft journal as at 7, 8, I prefer to form collars which by centrifugal action throw water issuing on the journal from the bearing surfaces, into the channels or compartments 9, 10, from which it may be collected and passed through suitable pipes and valves as 11, 12, or returned through the water inlet pipe 13, or in place of the collars 7 and 8 grooves may be turned in the shaft to accomplish the same result described in my copending application and as set forth below.

Also the bearing may be packed at each end as by the packing material 14, 15, which preferably should be of a yielding nature, to adjust itself to the position which the shaft takes with reference to the elastic surfaces 3, 4, and 5. The packing glands 16, 17 are also to be suitably bored to allow for said clearance.

The packing 14, 15 is understood to be retained in place and suitably compressed by the holding screws as 18, 19 of the glands 16, 17, and the material forming the sleeve 2 is understood to be prevented from rotation by any well known means as dovetailing into the body of the bearing as at 20, it being understood that in the method here shown 20, 20, form projections which fit into corresponding recesses in the material of the pedestal 1.

The operation is as follows:

The rubber or other elastic surfaces as of Figs. 2 or 3 are suitably secured in the pedestal 1 with the projecting portions in position to support the shaft. Water is admitted through the pipe 13, when it will circulate freely in the bearing and around the surfaces thereby wetting the exposed shaft journal surface. As the shaft rotates this water film is carried around and between the bearing surfaces and the journal and thus allows free rotation on the lubricated surfaces without wear and with a minimum of friction.

The yielding nature of the rubber or other elastic material enables an equalization of support over every unit of area and at the same time maintains a lubricating film of equal thickness throughout and therefore perfect support for the journal within the limits of the adhesion of the lubricant and the weight supported.

Reference is made to my co-pending application, Serial No. 360,703, filed February 24, 1920.

I claim:

1. In a bearing, a plurality of surfaces of rubber adapted to support a shaft and space between such surfaces for lubricant.

2. In a bearing, a plurality of surfaces of rubber adapted to support a shaft, space between such surfaces for liquid, means for supplying such liquid, and means for packing the shaft and bearing to prevent leakage.

3. In a bearing, a rubber bearing surface adapted to support a rotating shaft and means for circulating a liquid between the shaft and bearing surface.

4. In a bearing, a rubber member adapted to support a journal and a recess in said member for lubricant.

5. In a bearing, a plurality of surfaces of elastic material adapted to support a shaft, and space between such surfaces for lubricant.

6. In a bearing, a bearing surface of rubber having a channel formed on its surface adapted to pass lubricant therethrough.

7. In a bearing, a bearing surface essentially of rubber and a recess in said surface for lubricant.

8. In a bearing, a bearing surface of rubber and means for passing a lubricant through said bearing.

9. In a bearing, a bearing surface essentially or rubber and means for passing a lubricant through said bearing.

10. In a bearing, a bearing surface of elastic material and means for passing a lubricant through said bearing.

In testimony whereof, I have hereunto set my hand at San Francisco, California, this 17th day of February, 1920.

CHARLES FREDERIC SHERWOOD.

In presence of—
P. S. PIDWELL,
A. W. BOYKEN.

DISCLAIMER 1,416,988.—*Charles Frederic Sherwood*, Los Angeles, Calif. BEARING. Patent dated May 23, 1922. Disclaimer filed May 22, 1933, by the assignee, *Oliver-Sherwood Co.*

Hereby enters this disclaimer in the following words, to-wit:

Hereby disclaims from the scope of claims 1, 2, 3, 4, 6, 7, 8, and 9 any rubber other than soft-rubber.

[*Official Gazette June 20, 1933.*]